United States Patent
Lu et al.

(10) Patent No.: US 9,634,575 B2
(45) Date of Patent: Apr. 25, 2017

(54) CONTROL METHOD AND CONTROL DEVICE FOR INVERTER SYSTEM

(71) Applicant: Delta Electronics, Inc., Taoyuan (TW)

(72) Inventors: Cheng Lu, Taoyuan (TW); Jiamin Zhang, Taoyuan (TW); Jianhong Zhou, Taoyuan (TW); Hongyang Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 22 days.

(21) Appl. No.: 14/925,969

(22) Filed: Oct. 28, 2015

(65) Prior Publication Data

US 2016/0134201 A1    May 12, 2016

(30) Foreign Application Priority Data

Nov. 6, 2014   (CN) .......................... 201410621150.4

(51) Int. Cl.
*H02M 7/537*    (2006.01)
*H02M 7/44*    (2006.01)
(Continued)

(52) U.S. Cl.
CPC ............. *H02M 7/44* (2013.01); *H02M 7/493* (2013.01); *H02J 3/46* (2013.01)

(58) Field of Classification Search
CPC .................................................. H02M 7/537
(Continued)

(56) References Cited

U.S. PATENT DOCUMENTS 5,212,630 A * 5/1993 Yamamoto ............ H02M 7/493
363/65
5,642,275 A * 6/1997 Peng ....................... H02M 7/49
363/137
(Continued)

FOREIGN PATENT DOCUMENTS

| CN | 1581628 A | 2/2005 |
|---|---|---|
| CN | 103138290 A | 6/2013 |
| DE | 102006059199 B3 | 4/2008 |

OTHER PUBLICATIONS

Ting Liu, Jinjun Liu and Xuan Zhang, "A novel droop control strategy to share power equally and limit voltage deviation", 8th International Conference on Power Electronics-ECCE Asia, The Shilla Jeju, Korea, May 30-Jun. 3, 2011, pp. 1520-1526.
(Continued)

*Primary Examiner* — Adolf Berhane
*Assistant Examiner* — Nusrat Quddus
(74) *Attorney, Agent, or Firm* — CKC & Partners Co., Ltd.

(57) ABSTRACT

The present application discloses a control method and a control device for parallel inverters. The method comprises: receiving a feedback signal Vmg reflecting load voltage and a voltage reference signal Vref to generate a command signal $P_{set}$ reflecting active power and a command signal $Q_{set}$ reflecting reactive power; taking the command signal $P_{set}$ reflecting active power as the first offset of an active power-output voltage frequency curve (P-F) of an inverter unit, and taking the command signal $Q_{set}$ reflecting reactive power as the second offset of an reactive power-output voltage amplitude curve (Q-V) of the inverter unit; transversely translating the curve (P-F) of the inverter unit according to the first offset, transversely translating the curve (Q-V) of the inverter unit according to the second offset, and adjusting the load voltage of the inverter system
(Continued)

by means of adjusted output voltage frequency and output voltage amplitude of the inverter unit.

20 Claims, 10 Drawing Sheets

(51) Int. Cl.
*H02M 7/493* (2007.01)
*H02J 3/46* (2006.01)

(58) Field of Classification Search
USPC .............. 363/55, 56.01, 56.02, 95, 97, 71, 363/131–132
See application file for complete search history.

(56) References Cited

U.S. PATENT DOCUMENTS

| | | | | |
|---|---|---|---|---|
| RE37,126 E | * | 4/2001 | Peng | ........................ H02M 7/49 363/137 |
| 6,545,887 B2 | * | 4/2003 | Smedley | .................... H02J 3/01 363/44 |
| 2004/0136214 A1 | * | 7/2004 | Tan | ........................ H02M 7/493 363/71 |
| 2011/0115301 A1 | * | 5/2011 | Bhavaraju | ................. H02J 3/38 307/86 |
| 2014/0306533 A1 | * | 10/2014 | Paquin | .................... H02J 3/383 307/52 |

OTHER PUBLICATIONS

Estefania Planas et al, "Stability analysis and design of droop control method in dq frame for connection in parallel of Distributed energy resources", IECON-2012—38th Annual Conference on IEEE Industrial Electronics Society, IEEE, Oct. 25, 2012, pp. 5683-5688.

Gang Yao et al, "A central control strategy of parallel inverters in ac microgrid", IECON-2013—39th Annual Conference of the IEEE Industrial Electronics Society, IEEE, Nov. 10, 2013, pp. 7112-7117.

Haiyun Wang et al, "A hierarchical control of microgrid based on droop controlled voltage source converter", 2013 IEEE PES Asia—Pacific Power and Energy Engineering Conference (APPEEC), IEEE, Dec. 8, 2013, pp. 1-4.

Mukul C. Chandorkar et al, "Control of parallel connected inverters in standalone ac supply systems", IEEE Transactions on Industry Applications, IEEE Service Center, Piscataway, NJ, US, vol. 29, No. 1, Jan. 1, 1993, pp. 136-143.

Mukul C. Chandorkar et al, "Control of distributed UPS systems", Power Electronics Specialists Conference, PESC' 94 Record., 25th Annual IEEE Taipei, Taiwan Jun. 20-25, 1994, New York, NY , USA, IEEE, 1994-16-20, pp. 197-204.

Chia-tse Lee et al, "A grid synchronization method for droop-controlled distributed energy resource converters", IEEE Transactions on Industry Applications, IEEE Service Center, Piscataway, NJ, US, vol. 49, No. 2, Mar. 1, 2013, pp. 954-962.

* cited by examiner

CONTROL METHOD AND CONTROL DEVICE FOR INVERTER SYSTEM

CROSS-REFERENCE TO RELATED APPLICATIONS

This non-provisional application claims priority under 35 U.S.C. §119(a) on Patent Application No. 201410621150.4 filed in P.R. China on Nov. 6, 2014, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE PRESENT INVENTION

The present application relates to an inverter system, and particularly to a control method and a control device for an inverter system.

BACKGROUND OF THE INVENTION

An inverter unit is a power conversion device based on power electronic technology for converting electric energy from DC to AC or from AC to DC. Typically, modular parallel power system architectures have been widely applied, in order to facilitate expansion and make redundant designs or reach other purposes. As shown in FIG. 1, it is a schematic diagram of the structure of an inverter system in the related art. The inverter system in the prior art comprises N (N≥1) inverter units (VSCs), which are connected in parallel for supplying power for the local load.

For such a parallel power system, it is necessary to control evenly distribution of the load power among the N inverter units, as well as make the load voltage Vmg (i.e. a feedback signal Vmg reflecting load voltage) stabilize at a certain reference value Vref, for example, the reference value can be a constant sine wave at 220V and 50 Hz. One control objective is called load power sharing, and the other control objective is called voltage regulation.

Regarding the control objective of the voltage regulation, a voltage closed-loop control method is generally adopted, for example, multiple closed-loop control method using voltage in the outer loop and current in the inner loop, etc. As long as the band width of the voltage loop is designed to be wide enough, voltage control accuracy can be guaranteed. This is easy for a single inverter unit; however, when a plurality of inverter units are connected in parallel, the load voltage is co-determined by all the inverter units. Moreover, the output power of each of the inverter units is co-determined by its output voltage and output impedance. Since the respective component parameters and other parameters, such as line impedance, of the inverter units are very hard to be exactly the same in practice, the inverter units need to output different voltages in order to achieve power sharing. Therefore, it is not easy to fully achieve voltage regulation and power sharing objectives by simply setting the same voltage command for each inverter unit for voltage closed-loop control.

In the related art, droop control is one way to achieve the power sharing of parallel inverter units. The so-called droop control means that the output voltage command of the inverter unit varies as the output power changes, and typically manifests as a drooping curve. FIG. 2(a) is a schematic diagram of an active power-output voltage frequency curve. For example, in the case of inductive output impedance, the frequency ω of the output voltage of an inverter unit decreases as the active power P outputted by the inverter unit increases. FIG. 2(b) is a schematic diagram of a reactive power-output voltage amplitude curve, wherein the amplitude V of the output voltage of an inverter unit decreases as the reactive power Q outputted by the inverter unit increases. Moreover, in order to achieve a better power sharing effect, a drooping curve will have a greater tilt at the expense of voltage regulation factor, i.e., load will have a greater impact on the output voltage. That is to say, voltage regulation and power sharing cannot be achieved simultaneously, and a compromise often needs to be made for the design of an inverter system.

Thus it is necessary to find a solution on achieving effective power sharing and good voltage regulation simultaneously.

SUMMARY OF THE INVENTION

The present application discloses a control method for an inverter system, which comprises a plurality of inverter units connected in parallel. The method comprises: receiving a feedback signal Vmg reflecting load voltage and a voltage reference signal Vref; generating a command signal reflecting inverter output power according to the feedback signal Vmg reflecting load voltage and the voltage reference signal Vref, wherein the command signal reflecting inverter output power comprises a command signal $P_{set}$ reflecting active power and a command signal $Q_{set}$ reflecting reactive power; taking the command signal $P_{set}$ reflecting active power as the first offset of an active power-output voltage frequency curve (P-F) of an inverter unit, and taking the command signal $Q_{set}$ reflecting reactive power as the second offset of an reactive power-output voltage amplitude curve (Q-V) of the inverter unit; transversely translating the P-F of the inverter unit according to the first offset, and transversely translating the Q-V of the inverter unit according to the second offset, and adjusting the load voltage of the inverter system by means of the adjusted output voltage frequency and output voltage amplitude of the inverter unit.

The present application also discloses a control device for an inverter system. The inverter system comprises a plurality of inverter units connected in parallel. The control device comprises: a system voltage controller for receiving a feedback signal Vmg reflecting load voltage and a voltage reference signal Vref, and outputting a command signal reflecting inverter output power, wherein the command signal reflecting inverter output power comprises a command signal $P_{set}$ reflecting active power and a command signal $Q_{set}$ reflecting reactive power; a plurality of unit voltage controllers corresponding one to one to the plurality of inverter units, each of said unit voltage controller being used for receiving the command signal $P_{set}$ reflecting active power, the command signal $Q_{set}$ reflecting reactive power, a frequency set signal $\omega_{set}$, a voltage amplitude set signal $V_{set}$, and a feedback signal Vo reflecting output voltage and a feedback signal $i_o$ reflecting output current of the corresponding inverter unit, and outputting a voltage command signal e* of the inverter unit.

The above-mentioned technical solution of the present application allows a plurality of inverter units connected in parallel to achieve effective power sharing while maintaining good output voltage accuracy. Moreover, the output voltage can be adjusted such that it is synchronized with the voltage of another system to facilitate the interconnection between systems and meet the conditions for synchronization and closing.

BRIEF DESCRIPTION OF THE DRAWINGS

FIG. 2($b$) is a schematic diagram of a reactive power-output voltage amplitude curve in the related art.

FIG. 4($b$) is a schematic diagram of the translation of a reactive power-output voltage amplitude curve.

DESCRIPTION OF THE PREFERRED EMBODIMENT

In order to achieve effective power sharing among a plurality of inverter units connected in parallel while maintaining good output voltage accuracy, the present application provides a control method and a control device for an inverter system. Based on the traditional droop control, the translation of a drooping curve is set forth in the present application so as to adjust the frequency and amplitude of the voltage.

Figure 3:
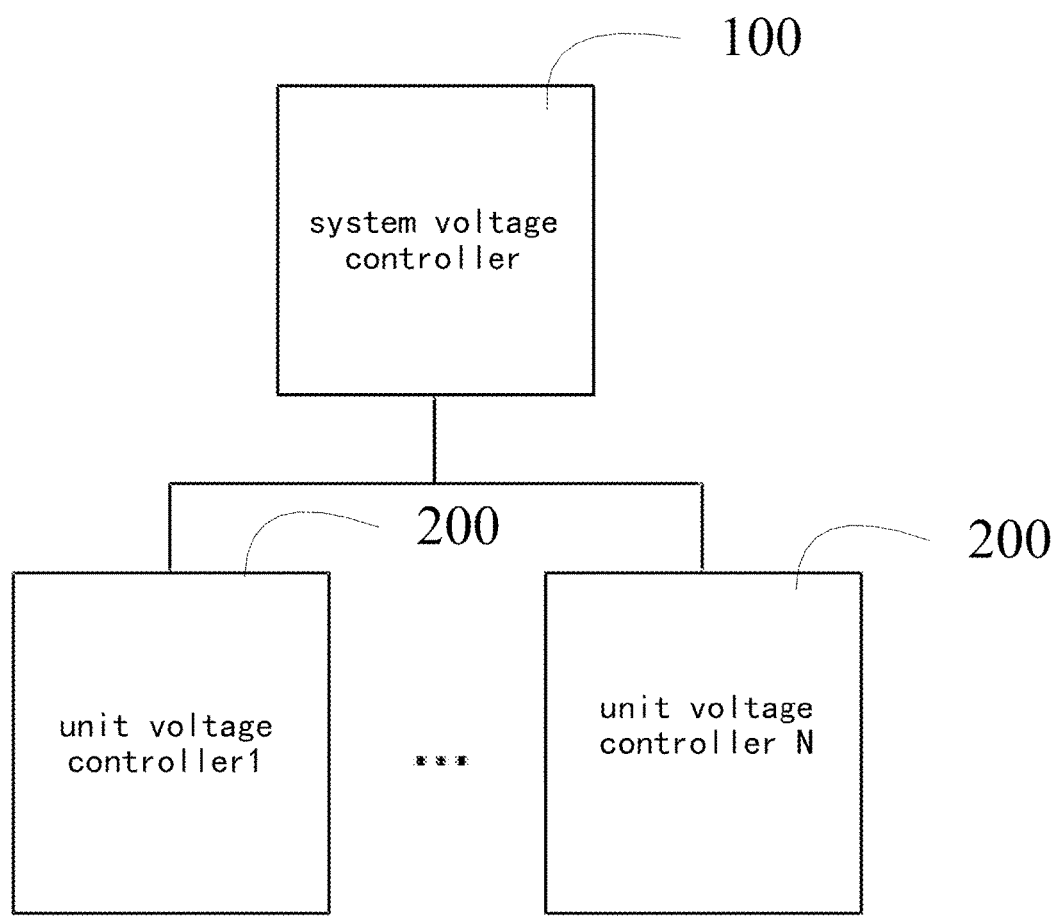
FIG. 3 is a schematic diagram of the control architecture of the control device for an inverter system according to the present application.

FIG. 3 is a schematic diagram of the control architecture of the control device for an inverter system according to the present application. The basic control architecture comprises two layers. The lower layer comprises N unit voltage controllers 200, each of which corresponds respectively to an inverter unit. The upper layer comprises a system voltage controller 100, which is connected to each of the unit voltage controllers 200.

The present application translates a drooping curve by using the control architecture as shown in FIG. 3 based on the traditional droop control, so as to adjust the frequency and amplitude of the voltage. FIG. 4 ($a$) is a schematic diagram of the translation of an active power-output voltage frequency curve, and FIG. 4($b$) is a schematic diagram of the translation of a reactive power-output voltage amplitude curve. In both FIG. 4($a$) and FIG. 4($b$), the curve (1) represents a curve in the related art.

In the related art, the frequency and amplitude of the corresponding output voltage are $\omega_{set}$ and $V_{set}$ in the case of no load respectively. The frequency and amplitude of the output voltage will decrease when the load increases.

Referring to the curve (1) shown in FIG. 4($a$), the output voltage frequency corresponding to an output active power $P_{set}$ (i.e. a command signal $P_{set}$ reflecting active power hereinafter) decreases to some extent, compared with the output voltage frequency (i.e. frequency set signal $\omega_{set}$ hereinafter) in the case of no load (the output active power is 0). As for the curve (1) shown in FIG. 4($b$), the output voltage amplitude corresponding to an output reactive power $Q_{set}$ (i.e. a command signal $Q_{set}$ reflecting reactive power hereinafter) decreases to some extent, compared with the output voltage amplitude (voltage amplitude set signal $V_{set}$) in the case of no load (the output reactive power is 0). Accordingly, the output voltage deviates from the set value caused by the droop control in the related art.

In the technical solution of the present application, the curve (1) is transversely translated to the curve (2) so that the frequency corresponding to the command signal $P_{set}$ reflecting active power returns back to $\omega_{set}$, and the amplitude corresponding to the command signal $Q_{set}$ reflecting reactive power returns back to $V_{set}$, thereby increasing the accuracy of the output voltage. Meanwhile, the droop characteristics are kept, and the power sharing property is maintained.

Figure 5:
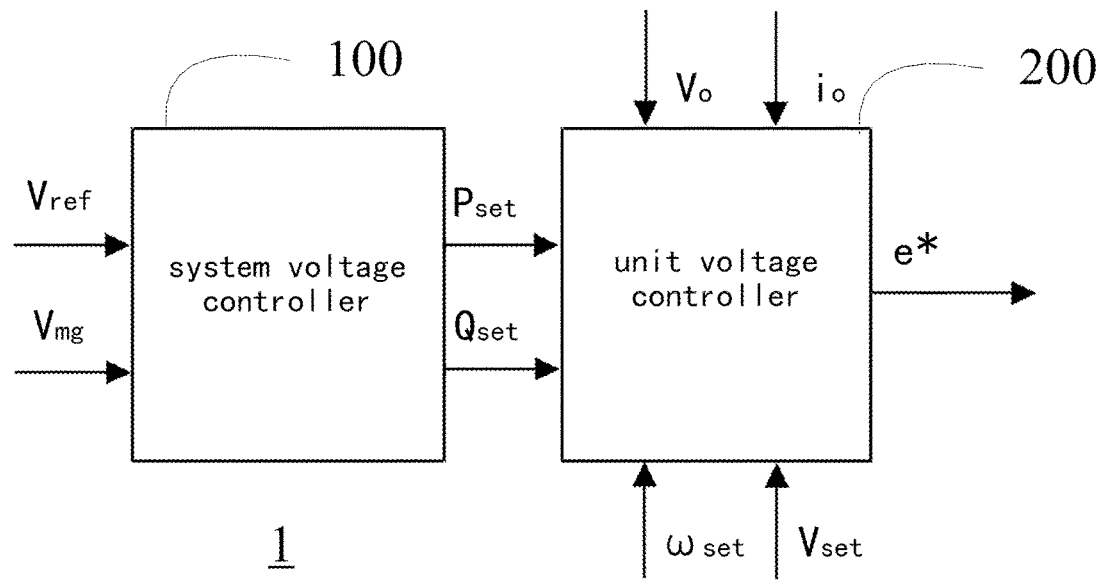
FIG. 5 is a schematic diagram of the structure of the control device for an inverter system according to the present application.

More specifically, FIG. 5 is a schematic diagram of the structure of the control device for an inverter system according to the present application. The control device 1 for the inverter system comprises the system voltage controller 100 and the plurality of unit voltage controllers 200.

The system voltage controller 100 is used for receiving a feedback signal Vmg reflecting load voltage and a voltage reference signal Vref, and for outputting a command signal reflecting inverter output power, wherein the command signal reflecting inverter output power comprises the command signal $P_{set}$ reflecting active power and the command signal $Q_{set}$ reflecting reactive power.

Each of the plurality of unit voltage controllers 200 corresponds one to one to each of the plurality of inverter units, and each unit voltage controller 200 is used for receiving the command signal $P_{set}$ reflecting active power, the command signal $Q_{set}$ reflecting reactive power, the frequency set signal $\omega_{set}$, the voltage amplitude set signal $V_{set}$, and a feedback signal Vo reflecting output voltage and a feedback signal $i_o$ reflecting output current of the corresponding inverter unit, and for outputting a voltage command signal e* of the corresponding inverter unit.

FIG. 5 only shows an example of the connection relationship between the system voltage controller 100 and one unit voltage controller 200. The actual connection relationship is referred in FIG. 3.

Figure 6:
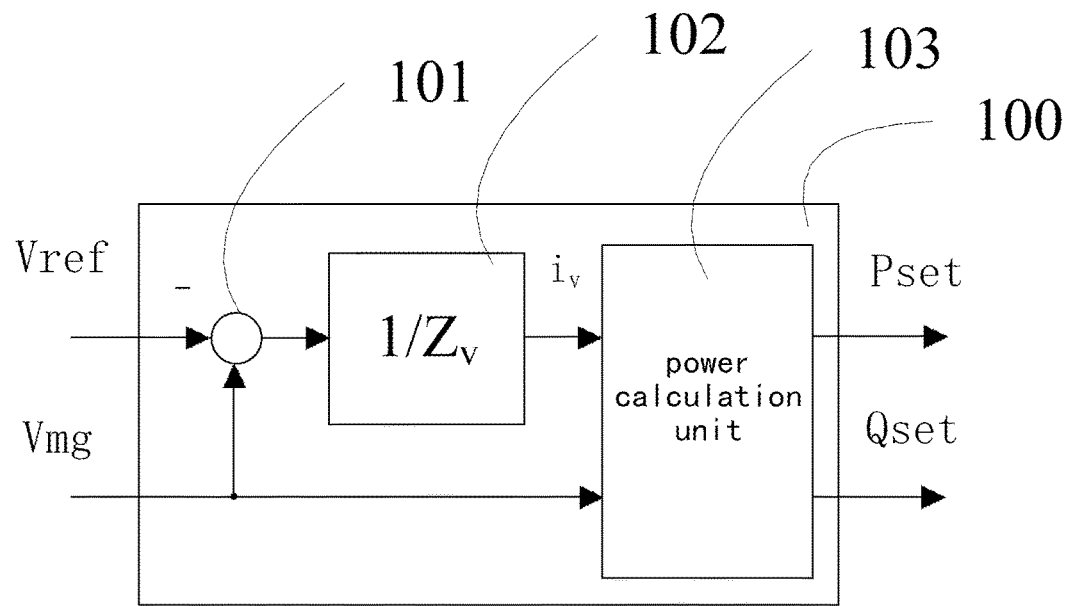
FIG. 6 is a schematic diagram of the structure of the system voltage controller according to the present application.

FIG. 6 is a schematic diagram of the structure of the system voltage controller 100 according to the present application.

The system voltage controller 100 comprises a virtual current calculation unit and a power calculation unit 103.

The virtual current calculation unit is used for calculating a virtual current iv based on the feedback signal Vmg reflecting load voltage and the voltage reference signal Vref.

The virtual current calculation unit comprises a deviation calculation unit 101 and acalculation unit 102 reflecting virtual impedance. The deviation calculation unit 101 receives the feedback signal Vmg reflecting load voltage and the voltage reference signal Vref, calculates and obtains a signal Vmg-Vref reflecting voltage deviation, and then sends the signal to the calculation unit 102 reflecting virtual impedance, thereby calculating and obtaining a virtual current iv. Wherein iv=(Vmg−Vref)/Zv, in which Zv is a virtual impedance. The virtual impedance Zv is a combination of a virtual resistance and a virtual reactance, a virtual resistance, or a virtual reactance. The virtual impedance Zv can be expressed as R+jX. R and X represent the virtual resistance and the virtual reactance respectively, and j is a virtual impedance parameter. The smaller R and X are, the smaller the deviation of the output voltage will be.

The power calculation unit 103 further comprises an active power calculation unit and a reactive power calculation unit.

The active power calculation unit obtains the command signal Pset reflecting active power by dot product computation, based on the feedback signal Vmg reflecting load voltage and the calculated virtual current iv.

The reactive power calculation unit obtains the command signal Qset reflecting reactive power by cross product computation, based on the feedback signal Vmg reflecting load voltage and the calculated virtual current iv.

$$P_{set} = v_{mg} \cdot i_v$$

$$Q_{set} = v_{mg} \otimes i_v$$

In an embodiment, in order to synchronize the output voltage of the inverter system with the voltage of another system to facilitate the interconnection between systems, the voltage reference signal Vref can be a feedback signal reflecting the voltage of the other system to meet the conditions for grid synchronization.

For example, the output of the inverter system is coupled to a power grid, and the voltage reference signal Vref can be a feedback signal of the voltage of the power grid.

Alternatively, the output of the inverter system is electrically coupled to the output of an AC system, and the voltage reference signal Vref is a feedback signal reflecting the output voltage of the AC system.

Figure 7:
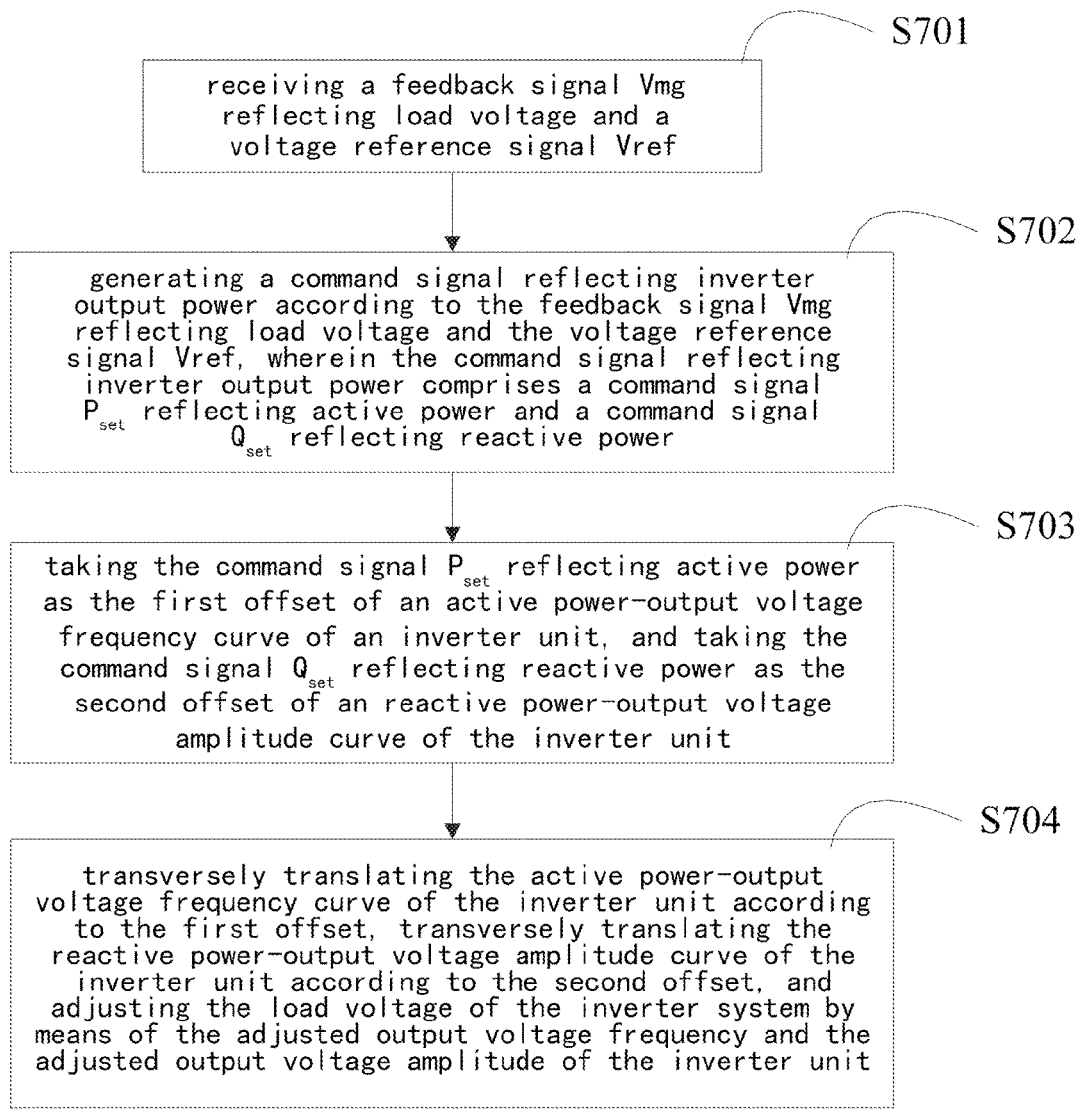
FIG. 7 is a flowchart of the control method for an inverter system according to the present application.

Referring to the structure shown in FIG. 5, the present application discloses a control method for an inverter system. FIG. 7 is a flowchart of the control method for an inverter system according to the present application.

Step 701: receiving the feedback signal Vmg reflecting load voltage and the voltage reference signal Vref;

Step 702: generating the command signal reflecting inverter output power according to the feedback signal Vmg reflecting load voltage and the voltage reference signal Vref, wherein the command signal reflecting inverter output power comprises the command signal $P_{set}$ reflecting active power and the command signal $Q_{set}$ reflecting reactive power;

Step 703: taking the command signal $P_{set}$ reflecting active power as the first offset of the active power-output voltage frequency curve (P-F) of the inverter unit, and taking the command signal $Q_{set}$ reflecting reactive power as the second offset of the reactive power-output voltage amplitude curve (Q-V) of the inverter unit;

Step 704: transversely translating the active power-output voltage frequency curve of the inverter unit according to the first offset, transversely translating the reactive power-output voltage amplitude curve of the inverter unit according to the second offset, and adjusting load voltage of the inverter system by means of adjusted output voltage frequency and the adjusted output voltage amplitude of the inverter unit.

The control method of the present application is suitable for a three-phase inverter system or a single-phase inverter system.

Hereinafter, the present application will be described by three examples of unit voltage controllers 200.

Embodiment 1

The unit voltage controller 200 has a basic architecture of a unit voltage controller with traditional droop control.

Figure 8:
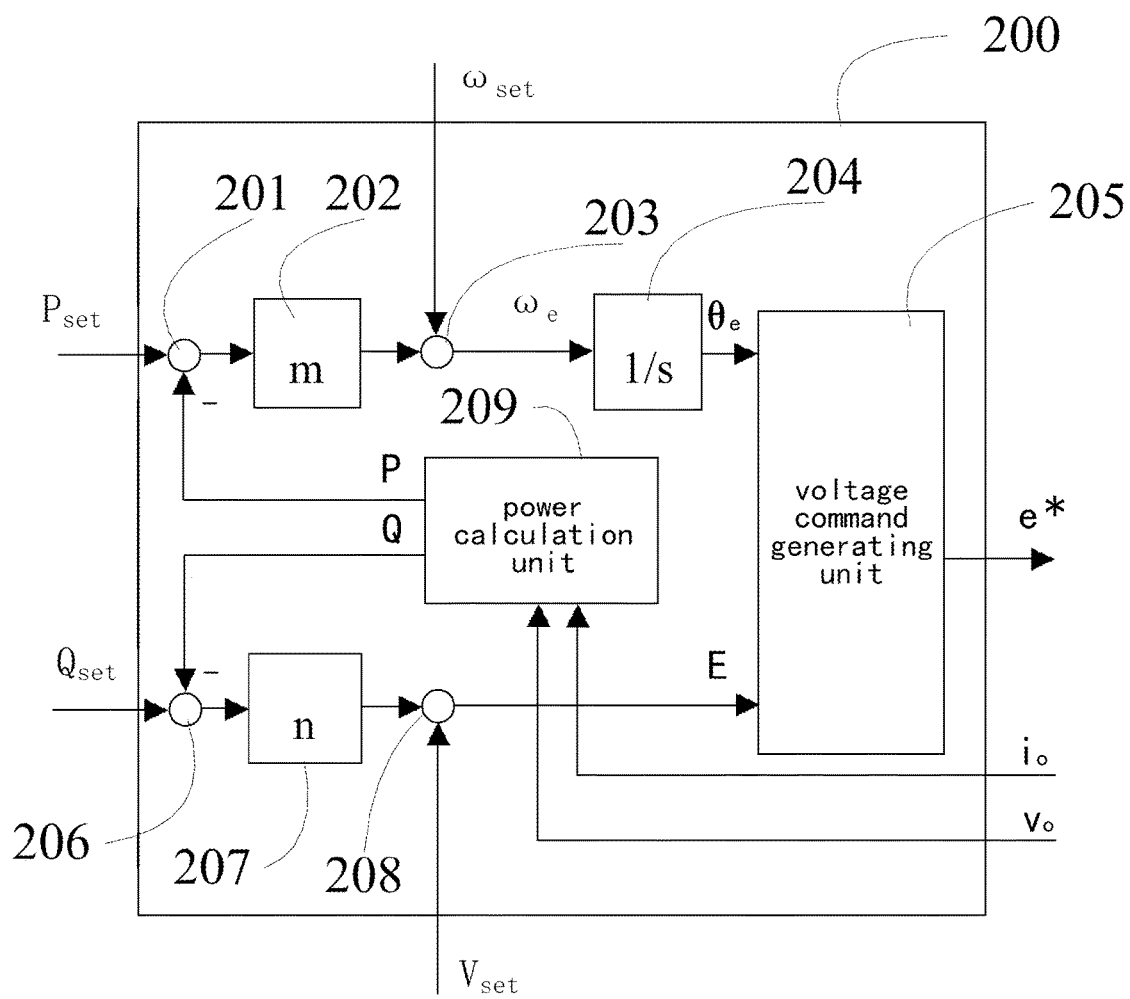
FIGS. 8, 9 and 10 are schematic diagrams of the structure of the unit voltage controller according to the present application.

FIG. 8 is a schematic diagram of the structure of a unit voltage controller 200 according to the present application. The unit voltage controller 200 comprises a frequency and phase generating unit, which further comprises an active power deviation generating unit 201, a first proportion unit 202, a first superposition unit 203, and a first integral unit 204.

The active power deviation generating unit 201 is used for calculating a deviation signal (Pset-P) reflecting deviation of active power, based on the command signal $P_{set}$ reflecting active power and a signal P reflecting active power of an inverter unit, and sending the deviation signal to the first proportion unit 202. The first proportion unit 202 has a proportionality factor m, which is a proportion unit gain reflecting droop characteristics of the active power. The first proportion unit 202 is used for receiving the deviation signal from the active power deviation generating unit 201 to obtain a first frequency control signal $(P_{set}-P)*m$ based on the proportionality factor m, and sending the first frequency control signal to the first superposition unit 203. The first superposition unit 203 is used for receiving and superposing the first frequency control signal $(P_{set}-P)*m$ and the frequency set signal $\omega_{set}$, and for outputting a control signal $\omega_e$ reflecting output voltage frequency of the inverter unit.

According to the control signal ωe, it can be known that the active power-output voltage frequency curve (P-F) of the inverter unit satisfies the following formula:

$$\omega = (P_{set}-P)m + \omega_{set} \quad (1)$$

In this formula, w is the control signal $\omega_e$ reflecting the output voltage frequency of the inverter unit.

The first integral unit 204 is used for integrating the control signal co, reflecting the output voltage frequency of the inverter unit to thereby obtain a phase control signal θe.

The unit voltage controller 200 further comprises a voltage amplitude generating unit, which further comprises a reactive power deviation generating unit 206, a second proportion unit 207 and a second superimposition unit 208.

The reactive power deviation generating unit 206 is used for calculating a deviation signal $(W_{set}-Q)$ reflecting deviation of reactive power, based on the command signal $Q_{set}$ reflecting reactive power and a signal Q reflecting reactive power of the inverter unit, and sending the deviation signal to the second proportion unit 207. The second proportion unit 207 has a proportionality factor n, which is a proportion unit gain reflecting droop characteristics of the reactive power. The second proportion unit 207 is used for receiving the deviation signal $(Q_{set}-Q)$ from the reactive power deviation generating unit to obtain a first voltage amplitude control signal $(Q_{set}-Q)*n$ based on the proportionality factor n, and sending the control signal to the second superposition unit 208. The second superposition unit 208 is used for receiving and superimposing the first voltage amplitude control signal $(Q_{set}-Q)*n$ and the voltage amplitude set signal Vset, and for outputting a control signal E reflecting the output voltage amplitude of the inverter unit.

According to the control signal E, it can be known that the reactive power-output voltage amplitude curve (Q-V) of the inverter unit satisfies the following formula:

$$E = (Qset-Q)n + Vset \quad (2)$$

The unit voltage controller 200 further comprises a voltage command generating unit 205 and a power calculation unit 209.

The input of the power calculation unit 209 comprises the feedback signal $i_o$ reflecting the output current of the inverter unit, and the feedback signal Vo reflecting the output voltage of the inverter unit. The output of the power calculation unit 209 comprises the signal P reflecting the active power of the inverter unit, and signal Q reflecting the reactive power of the inverter unit.

Wherein, $P=v_o \cdot i_o$, i.e., the power calculation unit 209 calculates the signal P reflecting the active power of the inverter unit by dot product computation of the feedback signal Vo reflecting the output voltage of the inverter unit and the feedback signal $i_o$ reflecting the output current of the inverter unit.

Wherein, $Q=v_o \otimes i_o$, i.e., the power calculation unit 209 calculates the signal Q reflecting the reactive power of the inverter unit by cross product computation of the feedback signal Vo reflecting the output voltage of the inverter unit and the feedback signal $i_o$ reflecting the output current of the inverter unit.

The voltage command generating unit 205 receives the phase control signal $\theta_e$ and the amplitude control signal E to further generate a voltage command signal e* reflecting the phase and the amplitude.

According to the formulae (1) and (2), the unit voltage controller 200 takes the command signal $P_{set}$ reflecting active power as the first offset of the active power-output voltage frequency curve (P-F) of the inverter unit, and takes the command signal $Q_{set}$ reflecting reactive power as the second offset of the reactive power-output voltage amplitude curve (Q-V) of the inverter unit.

Figure 4A:
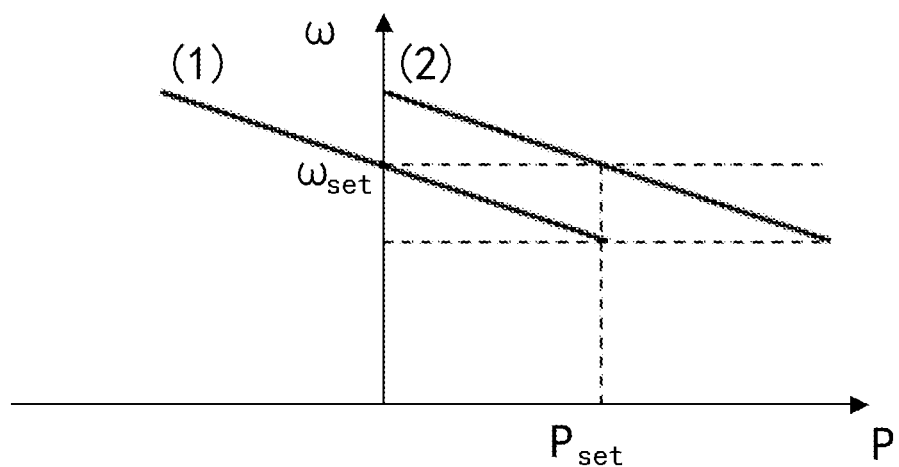
FIG. 4 ($a$) is a schematic diagram of the translation of an active power-output voltage frequency curve.
Figure 4B:
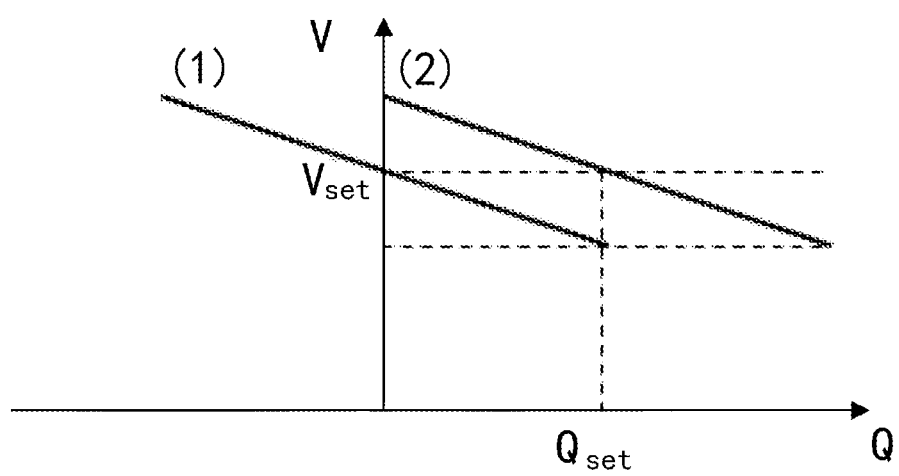

The unit voltage controller 200, by calculation, transversely translates the active power-output voltage frequency curve of the inverter unit to the curve (2) as shown in FIG. 4(a) according to the first offset, and transversely translates the reactive power-output voltage amplitude curve of the inverter unit to the curve (2) as shown in FIG. 4(b) according to the second offset.

Then, in the case that $P=P_{set}$, the control signal reflecting the output voltage frequency of the inverter unit is still $\omega_{set}$. In the case that $Q=Q_{set}$, the control signal reflecting the output voltage amplitude of the inverter unit is still Vset. The control signals are further used to adjust the load voltage of the inverter system. Therefore, an effective power sharing among a plurality of inverter units connected in parallel is achieved, as well as the droop characteristics are kept and the output voltage accuracy is well maintained simultaneously.

Embodiment 2

Figure 9:
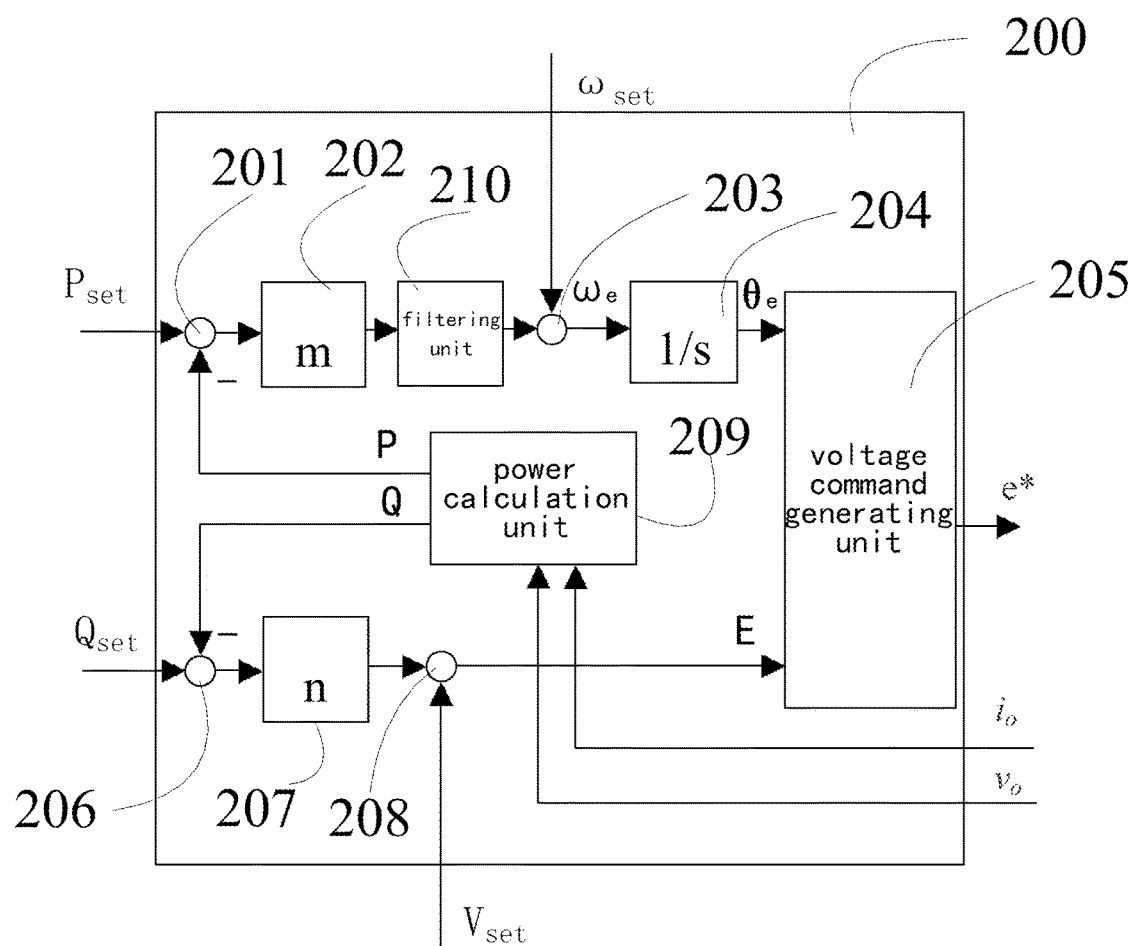

Embodiment 2 differs from Embodiment 1 in that the frequency and phase generating unit. In the present embodiment, the frequency and phase generating unit further comprises a filtering unit 210, which is disposed between the first proportion unit 202 and the first superimposition unit 203. FIG. 9 is a schematic diagram of the structure of the unit voltage controller 200 according to the present application. The signal transfer function of the filtering unit 210 is $((\tau_c s+1)/(\tau_f s+1))$, $1/\tau_f$ is the pole point of the filtering unit 210, and $1/\tau_c$ is the zero point of the filtering unit 210. In particular, in the case that $\tau_c=0$, the filtering unit 210 is a low pass filter.

The first frequency control signal $(P_{set}-P)*m$ is transmitted to the filtering unit 210. The filtering unit 210 computes the first frequency control signal according to the signal transfer function to thereby obtain a filtered signal $(P_{set}-P)((\tau_c s+1)/(\tau_f s+1))*m$, and applies the filtered signal to the first superimposition unit 203. The first superimposition unit 203 receives and superimposes the filtered signal $(P_{set}-P)((\tau_c s+1)/(\tau_f s+1))*m$ and the frequency set signal $\omega_{set}$, and outputs the control signal co, reflecting the output voltage frequency of the inverter unit. The remainder of Example 2 is the same as Example 1.

Then, the active power-output voltage frequency curve (P-F) of the inverter unit satisfies the following formula:

$$\omega=(P_{set}-P)((\tau_c s+1)/(\tau_f s+1))m+\omega_{set} \quad (3)$$

It can be seen that the filtering unit 210 is inserted to dynamically change the droop characteristics.

The reactive power-output voltage amplitude curve (Q-V) of the inverter unit satisfies the following formula:

$$E=(Q\text{set}-Q)n+V\text{set} \quad (4)$$

It is noted that a similar filtering unit may be inserted into the voltage amplitude generating unit, for example, the filtering unit may be inserted between the second proportion unit 207 and the second superimposition unit 208.

Likewise, the active power-output voltage frequency curve (P-F) of the inverter unit and the reactive power-output voltage amplitude curve (Q-V) of the inverter unit respectively satisfy the following formulae:

$$\omega=(P_{set}-P)m+\omega_{set} \quad (5)$$

$$E=(Q_{set}-Q)((\tau_c s+1)/(\tau_f s+1))n+V_{set} \quad (6)$$

wherein $\omega$ is the control signal reflecting the output voltage frequency of the inverter unit, P is the signal reflecting the active power of the inverter unit, $\omega_{set}$ is the frequency set signal, m is the proportion unit gain reflecting the droop characteristics of the active power, $V_{set}$ is the voltage amplitude set signal, Q is the signal reflecting the reactive power of the inverter unit, E is the control signal reflecting the output voltage amplitude of the inverter unit, n is a proportion unit gain reflecting the droop characteristics of the reactive power, $1/\tau_f$ is the pole point of a filtering unit, and $1/\tau_c$ is the zero point of a filtering unit. In particular, when $\tau_c=0$, the filtering unit 210 is a low pass filter.

As can be seen from the formulae (3), (4), (5) and (6), the unit voltage controller 200 takes the command signal $P_{set}$ reflecting active power as the first offset of the active power-output voltage frequency curve (P-F) of the inverter unit, and takes the command signal $Q_{set}$ reflecting reactive power as the second offset of the reactive power-output voltage amplitude curve (Q-V) of the inverter unit.

The unit voltage controller 200, by calculation, transversely translates the active power-output voltage frequency curve of the inverter unit to the curve (2) as shown in FIG. 4(a) according to the first offset, and transversely translates the reactive power-output voltage amplitude curve of the inverter unit to the curve (2) as shown in FIG. 4(b) according to the second offset.

Then, in the case that $P=P_{set}$, the control signal reflecting the output voltage frequency of the inverter unit is still $\omega_{set}$. In the case that $Q=Q_{set}$, the control signal reflecting the output voltage amplitude of the inverter unit is still $V_{set}$. The control signals are further used to adjust the load voltage of the inverter system. Therefore, an effective power sharing among a plurality of inverter units connected in parallel is achieved, as well as the droop characteristics are kept and the output voltage accuracy is well maintained simultaneously.

Embodiment 3

Figure 10:
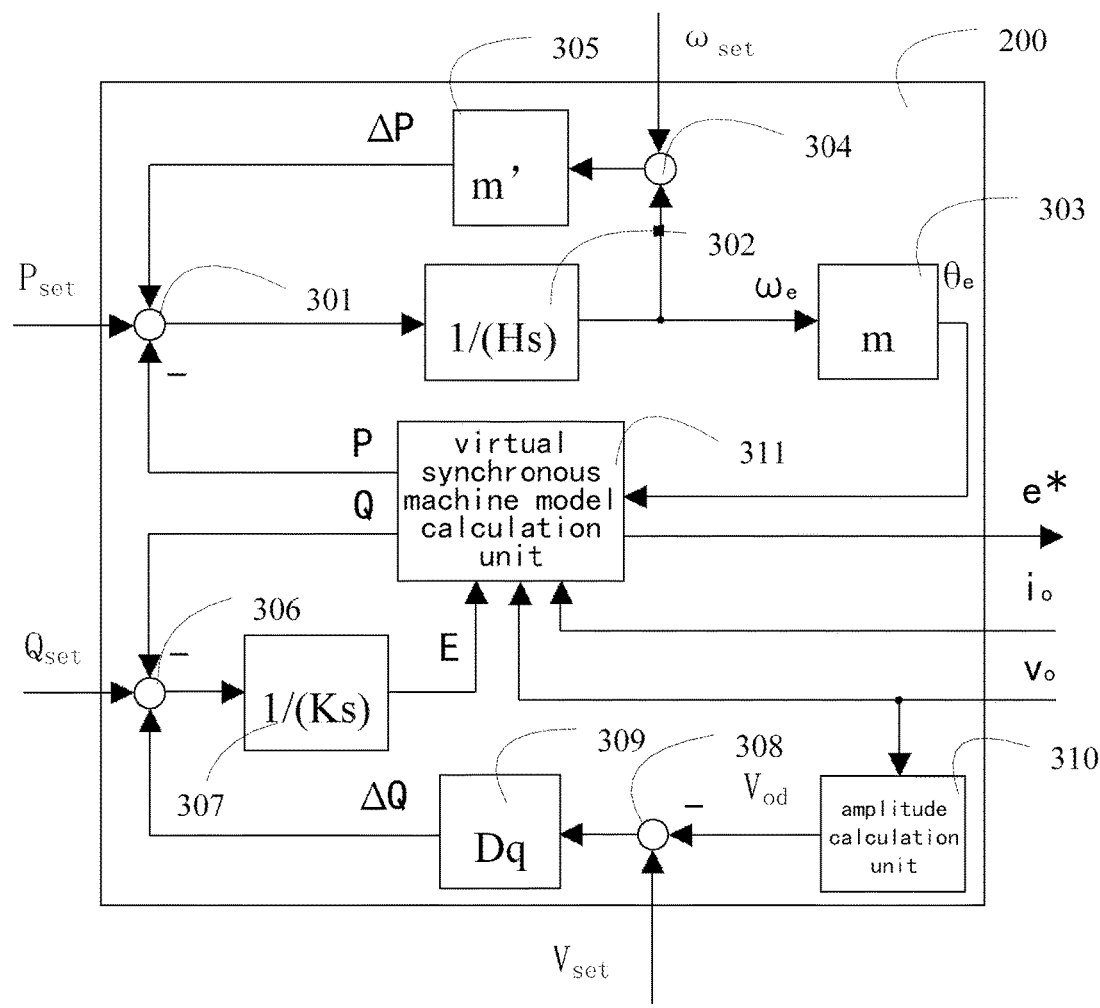

In the present embodiment, the unit voltage controller 200 may be a unit voltage control unit controlled by a virtual synchronous machine. FIG. 10 is a schematic diagram of the structure of the unit voltage controller 200 according to the present application.

The unit voltage controller 200 comprises a frequency and phase generating unit. The frequency and phase generating unit receives the command signal $P_{set}$ reflecting active power, a signal P reflecting the active power of an inverter unit, and an active power correction signal ΔP, calculates a virtual acceleration signal reflecting deviation of active power, applies the virtual acceleration signal to an integral unit reflecting a rotational inertia of a virtual motor, and, by adjustment, obtains a control signal $\omega_e$ reflecting the output voltage frequency of the inverter unit and a phase control signal θe.

Specifically, the frequency and phase generating unit comprises an active power deviation generating unit 301, a third integral unit 302, a fourth integral unit 303, a third superposition unit 304 and a third proportion unit 305.

The active power deviation generating unit 301 is used for calculating the virtual acceleration signal reflecting deviation of active power, based on the command signal $P_{set}$ reflecting active power, the signal P reflecting the active power of the inverter unit, and the active power correction signal ΔP.

The third integral unit 302 (1/Hs) is used for integrating the signal reflecting the deviation of active power to obtain a control signal $\omega_e$ reflecting output voltage frequency of the inverter unit.

The fourth integral unit 303 (1/s) is used for integrating the control signal ωe reflecting the output voltage frequency of the inverter unit to obtain a phase control signal θe.

The third superposition unit 304 is used for receiving the frequency set signal ωset and the control signal ωe reflecting the output voltage frequency of the inverter unit, and for outputting a frequency control signal.

The third proportion unit 305, which has a proportionality factor m', is used for receiving the frequency control signal to obtain the active power correction signal ΔP.

According to the above-mentioned structure of the frequency and phase generating unit, it can be known that the active power-output voltage frequency curve (P-F) of the inverter unit satisfies the following formula:

$$\omega = (P_{set} - P) \times \frac{1}{\frac{H}{m'}s+1} \times \frac{1}{m'} + \omega_{set} \times \frac{1}{\frac{H}{m'}s+1} \quad (7)$$

Because ωset is a constant value, so the formula (7) can be further simplified to the following formula:

$$\omega = (P_{set} - P) \times \frac{1}{\frac{H}{m'}s+1} \times \frac{1}{m'} + \omega_{set} \quad (8)$$

wherein ω is the control signal $\omega_e$ reflecting the output voltage frequency of the inverter unit, m' is the gain of the third proportion unit 305 that is reflecting the droop characteristics of the active power, and the integral gain of the third integral unit that is reflecting the rotational inertia of the virtual motor is 1/H.

The unit voltage controller 200 further comprises a voltage amplitude generating unit. The voltage amplitude generating unit further comprises a reactive power deviation generating unit 306, a fifth integral unit 307, a fourth superposition unit 308 and a fourth proportion unit 309.

The reactive power deviation generating unit 306 is used for receiving the command signal $Q_{set}$ reflecting reactive power, a signal Q reflecting the reactive power of the inverter unit and a reactive power correction signal ΔQ, and then calculating a signal reflecting deviation of reactive power;

The fifth integral unit 307 (1/(Ks)) is used for integrating the signal reflecting the deviation of reactive power to output a control signal E reflecting the output voltage amplitude of the inverter unit.

The fourth superposition unit 308 is used for receiving a signal Vod reflecting the output voltage amplitude of the inverter unit and the voltage amplitude set signal $V_{set}$, and for outputting a signal reflecting voltage deviation.

The fourth proportion unit 309, which has a proportionality factor Dq, is used for receiving the signal reflecting voltage deviation that is outputted by the fourth superposition unit 308, and then obtaining the reactive power correction signal ΔQ according to the proportionality factor Dq.

According to the above-mentioned structure of the voltage amplitude generating unit, it can be known that the reactive power-output voltage amplitude curve (Q-V) of the inverter unit satisfies the following formula:

$$E = (Q_{set} - Q) \times \frac{1}{\frac{K}{D_q}s+1} \times \frac{1}{D_q} + V_{set} \quad (9)$$

Wherein E is the control signal reflecting the output voltage amplitude of the inverter unit, Q is the signal reflecting the reactive power of the inverter unit, Dq is the gain of the fourth proportion unit that is reflecting the droop characteristics of the reactive power, and the integral gain of the fifth integral unit 307 reflecting the deviation of reactive power is 1/K.

The unit voltage controller 200 further comprises an amplitude calculation (Mag.) unit 310, which calculates the signal Vod reflecting the output voltage amplitude of the inverter unit based on the feedback signal Vo reflecting the output voltage of the inverter unit.

The unit voltage controller 200 further comprises a virtual synchronous machine model calculation unit 311, which is used for receiving the feedback signal $i_o$ reflecting the output current of the inverter unit, the feedback signal Vo reflecting the output voltage of the inverter unit, the control signal E reflecting the output voltage amplitude of the inverter unit, and the control signal θe reflecting the output voltage phase of the inverter unit, and for outputting the signal P reflecting the active power of the inverter unit, the signal Q reflecting the reactive power of the inverter unit, and the voltage command signal e*, wherein the voltage command signal e* is calculated based on the control signal E reflecting the output voltage amplitude of the inverter unit and the control signal θe reflecting the output voltage phase of the inverter unit, e*=E∠$\theta_e$.

The signal P reflecting the active power of the inverter unit is obtained by dot product computation of the feedback signal Vo reflecting the output voltage of the inverter unit and the feedback signal $i_o$ reflecting the output current of the inverter unit, P=$v_o$*$i_o$.

The signal Q reflecting the reactive power of the inverter unit is obtained by cross product computation of the feedback signal Vo reflecting the output voltage of the inverter unit and the feedback signal $i_o$ reflecting the output current of the inverter unit, $Q=v_o \otimes i_o$.

As can be seen from the formulae (7) and (8), the unit voltage controller 200 takes the command signal $P_{set}$ reflecting active power as the first offset of the active power-output voltage frequency curve (P-F) of an inverter unit, and takes the command signal $Q_{set}$ reflecting reactive power as the second offset of the reactive power-output voltage amplitude curve (Q-V) of the inverter unit.

The unit voltage controller 200, by calculation, transversely translates the active power-output voltage frequency curve of the inverter unit to the curve (2) as shown in FIG. 4(a) according to the first offset, and transversely translates the reactive power-output voltage amplitude curve of the inverter unit to the curve (2) as shown in FIG. 4(b) according to the second offset.

Then, in the case that $P=P_{set}$, the control signal reflecting the output voltage frequency of the inverter unit is still $\omega_{set}$. In the case that $Q=Q_{set}$, the control signal reflecting the output voltage amplitude of the inverter unit is still $V_{set}$. The control signals are further used to adjust the load voltage. Therefore, an effective power sharing among a plurality of inverter units connected in parallel is achieved, as well as the droop characteristics are kept and the output voltage accuracy is well maintained simultaneously.

The above three embodiments describes implementations of a unit voltage controller. Hereinafter, three different structures of the control device will be illustrated.

Embodiment 1

Figure 11:
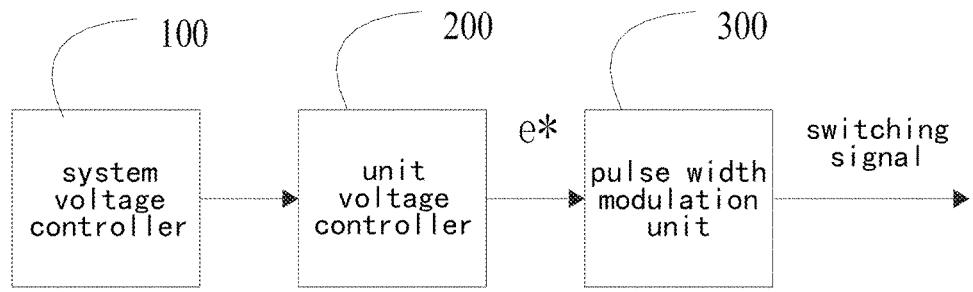
FIGS. 11, 12 and 13 are schematic diagrams of the structure of the control device according to the present application.

In addition to the system voltage controller 100 and the unit voltage controller 200, the control device further comprises a pulse width modulation (PWM) unit 300. The voltage command signal e* generated by the unit voltage controller 200 is sent to the pulse width modulation unit 300 to generate switching signals reflecting the voltage command signal e*, and the switching signals are further used to control the switching elements (e.g., IGBT, Mosfet, etc.) of the inverter unit FIG. 11 is a schematic diagram of the structure of the control device.

Embodiment 2

Figure 12:
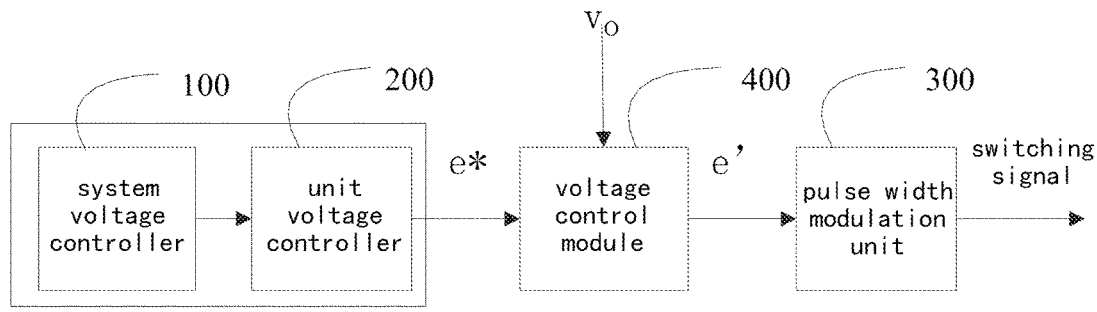

FIG. 12 is a schematic diagram of the structure of the control device.

In addition to the system voltage controller 100 and the unit voltage controller 200, the control device further comprises a voltage control module 400 and a pulse width modulation unit 300. The voltage control module 400 is used for receiving the voltage command signal e* and the feedback signal Vo reflecting the output voltage of the inverter unit, and further generating a second voltage command signal e' for closed-loop control. The voltage control module 400 makes Vo follow e*. The pulse width modulation unit 300 is used for receiving the second voltage command signal e' and generating switching signals for reflecting the second voltage command signal e', and controlling the switching elements of the inverter unit based on the switching signals.

Embodiment 3

Figure 13:
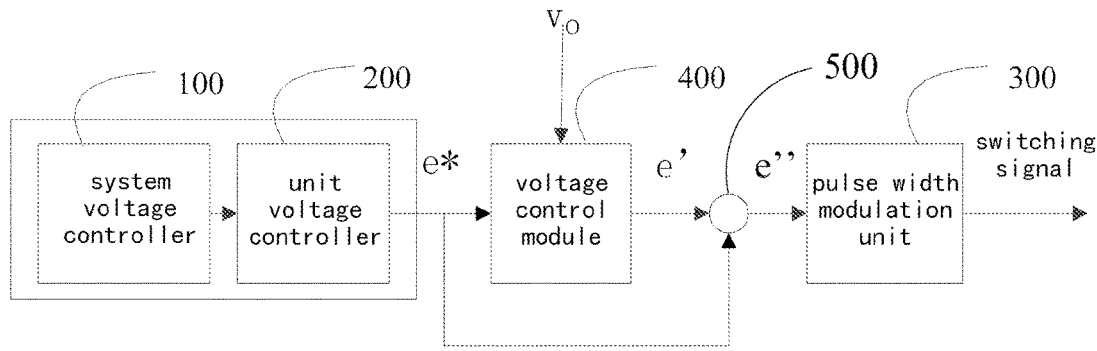

FIG. 13 is a schematic diagram of the structure of the control device.

In addition to the system voltage controller 100 and the unit voltage controller 200, the control device further comprises a voltage control module 400, a pulse width modulation unit 300 and a signal superposition unit 500.

The voltage control module 400 is used for receiving the voltage command signal e* and the feedback signal Vo reflecting the output voltage of the inverter unit, and generating a second voltage command signal e'. The signal superposition unit 500 is used for receiving and superimposing the voltage command signal e* and the second voltage command signal e', and generating a third voltage command signal e''. Thus, the voltage command signal e* applies a feed forward amount on e', to make Vo vary faster as e* varies, which also make the dynamic response of the system more faster. The pulse width modulation unit 300 is used for receiving the third voltage command signal e'' and generating switching signals reflecting the third voltage command signal, and controlling the switching elements of the inverter unit based on the switching signals.

In addition, the voltage control module 400 may also receive the feedback signal io reflecting the output current of the inverter unit and form dual closed-loop control with voltage in the outer loop and current in the inner loop. In this way, Vo can be better controlled such that it varies as e* varies.

Figure 1:
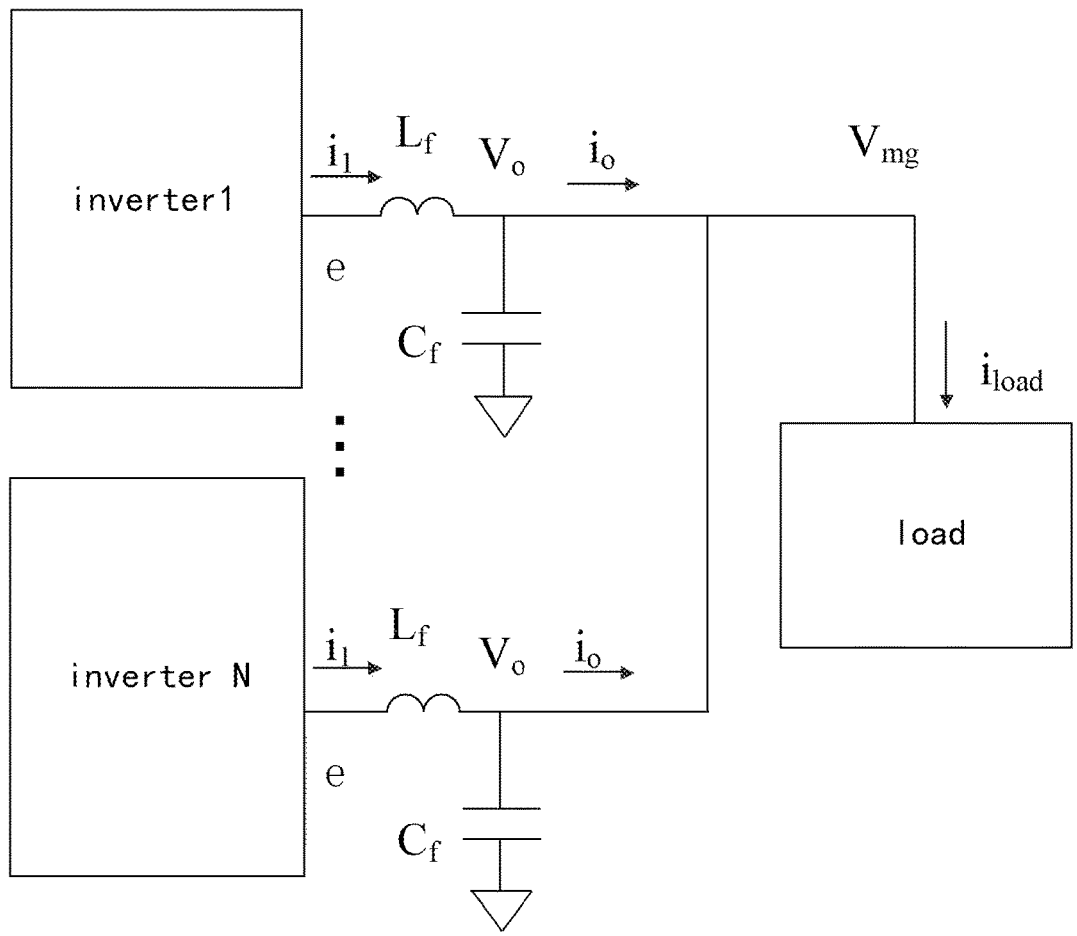
FIG. 1 is a schematic diagram of the structure of an inverter system in the related art.
Figure 2A:
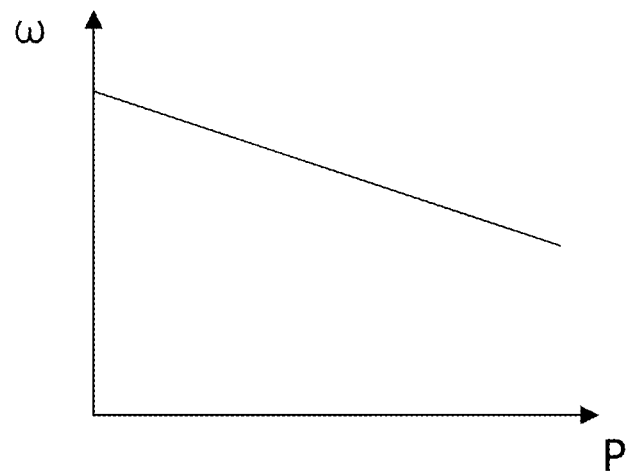
FIG. 2($a$) is a schematic diagram of an active power-output voltage frequency curve in the related art.
Figure 2B:
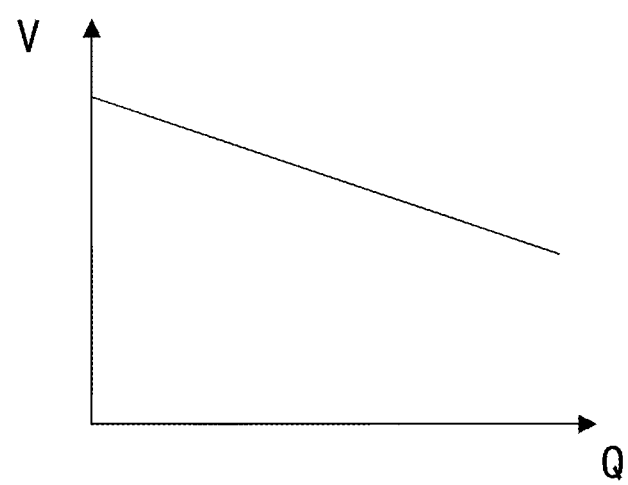

It should be noted that, in all the above-mentioned technical solutions, the feedback signal io reflecting the output current of the inverter unit may be the output current $i_o$ as shown in FIG. 1, or the current on the inductance Lr of the filter of the inverter unit. The feedback signal Vo reflecting the output voltage of the inverter unit may be the output voltage Vo as shown in FIG. 1, or the load voltage Vmg.

The above-mentioned technical solution of the present application achieves effective power sharing among a plurality of inverter units connected in parallel as well as maintains good output voltage accuracy. Moreover, the output voltage can be adjusted to be synchronized with the voltage of another system to facilitate the interconnection between systems and meet the conditions for grid synchronization and closing.

Although the present application has been disclosed above by the embodiments, they are not intended to limit the present application, and those skilled in the art can make some changes and modifications without departing from the spirit and essence of the present application. Therefore, the scope of protection of the present application is determined by the scopes of protection of the appended claims.

What is claimed is:

1. A method for controlling an inverter system including a plurality of inverter units coupled in parallel, the method comprising:

receiving a feedback signal Vmg reflecting load voltage and a voltage reference signal Vref;

generating a command signal reflecting inverter output power according to the feedback signal Vmg reflecting load voltage and the voltage reference signal Vref, wherein the command signal reflecting inverter output power comprises a command signal $P_{set}$ reflecting active power and a command signal $Q_{set}$ reflecting reactive power;

taking the command signal $P_{set}$ reflecting active power as the first offset of an active power-output voltage frequency curve (P-F) of the inverter unit, and taking the command signal $Q_{set}$ reflecting reactive power as the second offset of an reactive power-output voltage amplitude curve (Q-V) of the inverter unit;

transversely translating the active power-output voltage frequency curve (P-F) of the inverter unit according to the first offset, transversely translating the reactive power-output voltage amplitude curve (Q-V) of the inverter unit according to the second offset, and adjusting load voltage of the inverter system by means of adjusted output voltage frequency and output voltage amplitude of the inverter unit.

2. The method according to claim 1, wherein the step of generating the command signal reflecting inverter output power further comprises:

calculating a virtual current $i_v$ based on the feedback signal Vmg reflecting load voltage and the voltage reference signal Vref;

obtaining the command signal $P_{set}$ reflecting active power by dot product computation, based on the feedback signal Vmg reflecting load voltage and the calculated virtual current $i_v$; and obtaining the command signal $Q_{set}$ reflecting reactive power by cross product computation, based on the feedback signal Vmg reflecting load voltage and the calculated virtual current $i_v$, $$i_v = (Vmg - Vref)/Z_v$$

$$P_{set} = v_{mg} \cdot i_v$$

$$Q_{set} = v_{mg} \otimes i_v$$

Wherein $Z_v$ is a virtual impedance which is a combination of a virtual resistance and a virtual reactance, a virtual resistance, or a virtual reactance.

3. The method according to claim 1, wherein the output of the inverter system is coupled to a power grid or an AC system, and the voltage reference signal Vref is a feedback signal of the voltage of the power grid or a feedback signal reflecting the output voltage of the AC system.

4. The method according to claim 1, wherein the active power-output voltage frequency curve (P-F) of the inverter unit and the reactive power-output voltage amplitude curve (Q-V) of the inverter unit respectively satisfy any of the formulae groups (1)-(4):

formulae group (1):

$$\omega = (Pset - P)m + \omega_{set}$$

$$E = (Q_{set} - Q)n + Vset$$

formulae group (2):

$$\omega(P_{set} - P)((\tau_c s + 1)/(\tau_f s + 1))m + \omega_{set}$$

$$E = (Q_{set} - Q)n + V_{set}$$

formulae group (3):

$$\omega = (P_{set} - P)m + \omega_{set}$$

$$E = (Qset - Q)((\tau_c s + 1)/(\tau_f s + 1))n + Vset$$

formulae group (4):

$$\omega = (P_{set} - P) \times \frac{1}{\frac{H}{m'}s + 1} \times \frac{1}{m'} + \omega_{set},$$

$$E = (Q_{set} - Q) \times \frac{1}{\frac{K}{D_q}s + 1} \times \frac{1}{D_q} + V_{set},$$

wherein $\omega$ is a control signal reflecting output voltage frequency of the inverter unit, P is a signal reflecting active power of the inverter unit, $\omega_{set}$ is a frequency set signal, m is a proportion unit gain reflecting droop characteristics of the active power, $V_{set}$ is a voltage amplitude set signal, Q is a signal reflecting reactive power of the inverter unit, E is a control signal reflecting output voltage amplitude of the inverter unit, and n is a proportion unit gain reflecting droop characteristics of the reactive power, $1/\tau_f$ is a pole point of a filtering unit, $1/\tau_c$ is a zero point of a filtering unit, m' is a proportion unit gain reflecting droop characteristics of the active power, an integral gain of an integral unit reflecting a rotational inertia of a virtual motor is 1/H, Dq is a proportion unit gain reflecting droop characteristics of the reactive power, and a integral gain of an integral unit reflecting deviation of reactive power is 1/K.

5. The method according to claim 4, wherein the filtering unit is a low pass filter.

6. The method according to claim 1, wherein the method is suitable for a three-phase inverter system or a single-phase inverter system.

7. A control device for an inverter system comprising a plurality of inverter units connected in parallel, the control device comprising:

a system voltage controller for receiving a feedback signal Vmg reflecting load voltage and a voltage reference signal Vref, and for outputting a command signal reflecting inverter output power, wherein the command signal reflecting inverter output power comprises a command signal $P_{set}$ reflecting active power and a command signal $Q_{set}$ reflecting reactive power;

a plurality of unit voltage controllers corresponding to the plurality of inverter units respectively, each unit voltage controller being used for receiving the command signal $P_{set}$ reflecting active power, the command signal $Q_{set}$ reflecting reactive power, a frequency set signal $\omega_{set}$, a voltage amplitude set signal $V_{set}$, and a feedback signal Vo reflecting output voltage and a feedback signal $i_o$ reflecting output current of the corresponding inverter unit, and for outputting a voltage command signal e* of the inverter unit.

8. The control device according to claim 7, wherein the unit voltage controller takes the command signal $P_{set}$ reflecting active power as the first offset of an active power-output voltage frequency curve (P-F) of the inverter unit, takes the command signal $Q_{set}$ reflecting reactive power as the second offset of an reactive power-output voltage amplitude curve (Q-V) of the inverter unit, transversely translates the active power-output voltage frequency curve (P-F) of the inverter unit according to the first offset, transversely translates the reactive power-output voltage amplitude curve (Q-V) of the inverter unit according to the second offset, and adjusts load voltage of the inverter system by means of adjusted output voltage frequency and output voltage amplitude of the inverter unit.

9. The control device according to claim 7, wherein the system voltage controller further comprises a virtual current calculation unit for calculating a virtual current $i_v$ based on the feedback signal Vmg reflecting load voltage and the voltage reference signal Vref, $$i_v = (Vmg - Vref)/Z_v$$

wherein $Z_v$ is a virtual impedance, which is a combination of a virtual resistance and a virtual reactance, a virtual resistance, or a virtual reactance.

10. The control device according to claim 9, wherein the system voltage controller further comprises an active power calculation unit and a reactive power calculation unit, the active power calculation unit obtains the command signal $P_{set}$ reflecting active power by dot product computation, based on the feedback signal Vmg reflecting load voltage and the calculated virtual current $i_v$; and the reactive power calculation unit obtains the command signal $Q_{set}$ reflecting reactive power by cross product computation, based on the feedback signal Vmg reflecting load voltage and the calculated virtual current $i_v$, $$P_{set}=v_{mg} \cdot i_v$$

$$Q_{set}=v_{mg} \otimes i_v.$$

11. The control device according to claim 7, wherein the output of the inverter system is coupled to a power grid or an AC system, and the voltage reference signal Vref is a feedback signal of the voltage of the power grid or a feedback signal reflecting the output voltage of the AC system.

12. The control device according to claim 7, wherein the unit voltage controller comprises:

an active power deviation generating unit for calculating a deviation signal reflecting deviation of active power, based on the command signal $P_{set}$ reflecting active power and a signal P reflecting active power of the inverter unit;

a first proportion unit having a proportionality factor m, for receiving the deviation signal from the active power deviation generating unit to obtain a first frequency control signal based on the proportionality factor m;

a first superposition unit for receiving the first frequency control signal and the frequency set signal $\omega_{set}$, and for outputting a control signal $\omega_e$ reflecting output voltage frequency of the inverter unit; and a first integral unit for integrating the control signal $\omega_e$ reflecting the output voltage frequency of the inverter unit to thereby obtain a phase control signal $\theta_e$;

wherein the active power-output voltage frequency curve (P-F) of the inverter unit satisfies the following formula:

$$\omega=(Pset-P)m+\omega_{set},$$

wherein $\omega$ is the control signal $\omega_e$ reflecting the output voltage frequency of the inverter unit, P is the signal reflecting the active power of the inverter unit, $\omega_{set}$ is the frequency set signal, and m is the proportion unit gain reflecting the droop characteristics of the active power.

13. The control device according to claim 12, wherein the unit voltage controller further comprises a filtering unit connected in series to the first proportion unit, the signal transfer function of the filtering unit is $((\tau_c s+1)/(\tau_f s+1))$, $1/\tau_f$ is a pole point of the filtering unit, and $1/\tau_c$ is a zero point of the filtering unit, the active power-output voltage frequency curve (P-F) of the inverter unit satisfies the following formula:

$$\omega=(P_{set}-P)((\tau_c s+1)/(\tau_f s+1))m+\omega_{set}.$$

14. The control device according to claim 7, wherein the unit voltage controller comprises:

a reactive power deviation generating unit for calculating a deviation signal reflecting deviation of reactive power, based on the command signal $Q_{set}$ reflecting reactive power and a signal Q reflecting reactive power of the inverter unit;

a second proportion unit having a proportionality factor n, for receiving the deviation signal from the reactive power deviation generating unit to obtain a first voltage amplitude control signal; and a second superposition unit for receiving the first voltage amplitude control signal and the voltage amplitude set signal $V_{set}$, and for outputting a control signal E reflecting output voltage amplitude of the inverter unit;

wherein the reactive power-output voltage amplitude curve (Q-V) of the inverter unit satisfies the following formula:

$$E=(Qset-Q)n+Vset,$$

wherein E is the control signal reflecting the output voltage amplitude of the inverter unit, $V_{set}$ is the voltage amplitude set signal, Q is the signal reflecting the reactive power of the inverter unit, and n is the proportion unit gain reflecting the droop characteristics of the reactive power.

15. The control device according to claim 14, wherein the unit voltage controller further comprises a filtering unit connected in series to the second proportion unit, the signal transfer function of the filtering unit is $((\tau_c s+1)/(\tau_f s+1))$, $1/\tau_f$ is a pole point of the filtering unit, and $1/\tau_c$ is a zero point of the filtering unit, the reactive power-output voltage amplitude curve (Q-V) of the inverter unit satisfies the following formula:

$$E=(Q_{set}-Q)((\tau_c s+1)/(\tau_f s+1))n+V_{set}.$$

16. The control device according to claim 7, wherein the unit voltage controller comprises:

an active power deviation generating unit for calculating a signal reflecting deviation of active power, based on the command signal $P_{set}$ reflecting active power, a signal P reflecting active power of the inverter unit, and an active power correction signal $\Delta P$;

a third integral unit for integrating the signal reflecting the deviation of active power to obtain a control signal $\omega_e$ reflecting output voltage frequency of the inverter unit;

a fourth integral unit for integrating the control signal $\omega_e$ reflecting the output voltage frequency of the inverter unit to obtain a phase control signal $\theta_e$;

a third superposition unit for receiving the frequency set signal $\omega_{set}$ and the control signal $\omega_e$ reflecting the output voltage frequency of the inverter unit, and for outputting a frequency control signal; and a third proportion unit having a proportionality factor m', for receiving the frequency control signal to obtain the active power correction signal $\Delta P$, wherein the active power-output voltage frequency curve (P-F) of the inverter unit satisfies the following formula:

$$\omega = (P_{set} - P) \times \frac{1}{\frac{H}{m'}s+1} \times \frac{1}{m'} + \omega_{set},$$

wherein $\omega$ is the control signal reflecting the output voltage frequency of the inverter unit, m' is a gain of the third proportion unit reflecting the droop characteristics of the active power, and the integral gain of the third integral unit reflecting a rotational inertia of a virtual motor is 1/H.

17. The control device according to claim 7, wherein the unit voltage controller comprises:

a reactive power deviation generating unit for calculating a signal reflecting deviation of reactive power, based on the command signal $Q_{set}$ reflecting reactive power, a signal Q reflecting reactive power of the inverter unit and a reactive power correction signal $\Delta Q$;

a fifth integral unit for integrating the signal reflecting the deviation of reactive power to output a control signal E reflecting output voltage amplitude of the inverter unit;

a fourth superposition unit for receiving a signal $V_{od}$ reflecting output voltage amplitude of the inverter unit and the voltage amplitude set signal $V_{set}$, and for outputting a signal reflecting voltage deviation; and a fourth proportion unit having a proportionality factor Dq, for receiving the signal reflecting voltage deviation to obtain the reactive power correction signal $\Delta Q$, wherein the reactive power-output voltage amplitude curve (Q-V) of the inverter unit satisfies the following formula:

$$E = (Q_{set} - Q) \times \frac{1}{\frac{K}{D_q}s + 1} \times \frac{1}{D_q} + V_{set}$$

wherein E is the control signal reflecting the output voltage amplitude of the inverter unit, Q is the signal reflecting the reactive power of the inverter unit, Dq is the gain of the fourth proportion unit reflecting the droop characteristics of the reactive power, and the integral gain of the fifth integral unit reflecting the deviation of reactive power is 1/K.

18. The control device according to claim 7, wherein the unit voltage controller comprises a virtual synchronous machine model calculation unit for receiving the feedback signal $i_o$ reflecting the output current of the inverter unit, the feedback signal $V_o$ reflecting the output voltage of the inverter unit, a control signal E reflecting output voltage amplitude of the inverter unit, and a control signal $\theta_e$ reflecting output voltage phase of the inverter unit, and for outputting a signal P reflecting active power of the inverter unit, a signal Q reflecting reactive power of the inverter unit, and the voltage command signal e*, wherein:

the voltage command signal e* is calculated based on the control signal E reflecting the output voltage amplitude of the inverter unit and the control signal $\theta_e$ reflecting the output voltage phase of the inverter unit, $e^* = E \angle \theta_e$;

the signal P reflecting the active power of the inverter unit is obtained by dot product computation of the feedback signal $V_o$ reflecting the output voltage of the inverter unit and the feedback signal $i_o$ reflecting the output current of the inverter unit, $P = v_o \cdot i_o$;

the signal Q reflecting the reactive power of the inverter unit is obtained by cross product computation of the feedback signal $V_o$ reflecting the output voltage of the inverter unit and the feedback signal $i_o$ reflecting the output current of the inverter unit, $W = v_o \otimes i_o$.

19. The control device according to claim 7, wherein the control device further comprises any of the following groups:

group one:
a pulse width modulation unit for receiving the voltage command signal e*, and generating switching signals reflecting the voltage command signal, so that the switching elements in the inverter unit are controlled by the switching signals;

group two:
a voltage control module and a pulse width modulation unit,
wherein the voltage control module is used for receiving the voltage command signal e* and the feedback signal $V_o$ reflecting the output voltage of the inverter unit, and generating a second voltage command signal e'; and the pulse width modulation unit is used for receiving the second voltage command signal e', and generating switching signals reflecting the second voltage command signal, so that the switching elements in the inverter unit are controlled by the switching signals;

group three:
a voltage control module, a pulse width modulation unit and a signal superposition unit,
wherein the voltage control module is used for receiving the voltage command signal e* and the feedback signal $V_o$ reflecting the output voltage of the inverter unit, and generating a second voltage command signal e'; and the signal superimposing unit is used for receiving the voltage command signal e* and the second voltage command signal e', and generating a third voltage command signal e''; the pulse width modulation unit is used for receiving the third voltage command signal e'', and generating switching signals reflecting the third voltage command signal, so that the switching elements in the inverter unit are controlled by the switching signals.

20. The control device according to claim 7, wherein the control device is suitable for a three-phase inverter system or a single-phase inverter system.

* * * * *